UNITED STATES PATENT OFFICE.

WILLIAM MORRISON, OF CHICAGO, ILLINOIS, ASSIGNOR TO VESTA ACCUMULATOR COMPANY, A CORPORATION OF INDIANA.

SEPARATOR FOR STORAGE-BATTERY PLATES.

1,228,369.      Specification of Letters Patent.    Patented May 29, 1917.

No Drawing.     Application filed April 2, 1917. Serial No. 159,286.

*To all whom it may concern:*

Be it known that I, WILLIAM MORRISON, a citizen of the United States, residing at Chicago, in the county of Cook and State of Illinois, have invented certain new and useful Improvements in Separators for Storage-Battery Plates, of which the following is a specification.

This invention relates to wood or other porous separators for storage battery plates and the process of making the same.

The preferred method of making my improved separator consists in immersing it in a hot, preferably boiling, solution of strontium hydroxid and allowing it to remain therein until the solution has impregnated the pores of the separator.

I then immerse the impregnated separator in a sulfate solution, such as a sulfuric acid solution, whereby sulfate of strontium is precipitated in the pores of the separator. The plates are then preferably washed in water.

As the result of this treatment, the pores of the separator are filled to a large degree with the precipitated strontium salt. Excessive porosity of separators, especially when made of wood, is thus corrected and treeing is prevented without materially affecting the internal resistance of the battery.

While I have described strontium sulfate as the salt with which the separators are impregnated, other salts of strontium substantially insoluble in the battery electrolyte and not decomposed upon passage of the current, may obviously be used, these salts being precipitated from the solution of the strontium compound by addition of the appropriate reagent. The separators are preferably kept moist until used.

I claim:—

1. A separator for storage battery plates having in its pores an insoluble strontium compound.

2. A separator having in its pores a strontium compound insoluble in sulfuric acid.

3. A separator having strontium sulfate in its pores.

4. The method of treating porous separators, which consists in introducing into the pores a solution of strontium hydroxid, and then converting the strontium hydroxid into strontium sulfate.

5. The method of treating porous separators, which consists in introducing into the pores a solution of strontium hydroxid, and then subjecting the treated separators to the action of sulfuric acid.

6. The method of treating porous separators, which consists in producing in the pores thereof an insoluble strontium compound.

In testimony whereof I affix my signature in presence of two witnesses.

WILLIAM MORRISON.

Witnesses:
 H. F. BARBOND,
 J. H. KIMMAL.

It is hereby certified that in Letters Patent No. 1,228,369, granted May 29, 1917, upon the application of William Morrison, of Chicago, Illinois, for an improvement in "Separators for Storage-Battery Plates," an error appears requiring correction as follows: In the grant and in the heading to the printed specification the State of incorporation of the assignee was erroneously given as "Indiana," whereas said State should have been given as *Illinois*, as shown by the records of assignments in this office; and that the said Letters Patent should be read with this correction therein that the same may conform to the record of the case in the Patent Office.

Signed and sealed this 17th day of July, A. D., 1917.

[SEAL.]

F. W. H. CLAY,
*Acting Commissioner of Patents.*

Cl. 204—29.